July 12, 1960 W. T. RENTSCHLER 2,944,473
PHOTOGRAPHIC INTRA-LENS SHUTTER COUPLED WITH AN EXPOSURE METER
Filed April 1, 1958 2 Sheets-Sheet 1
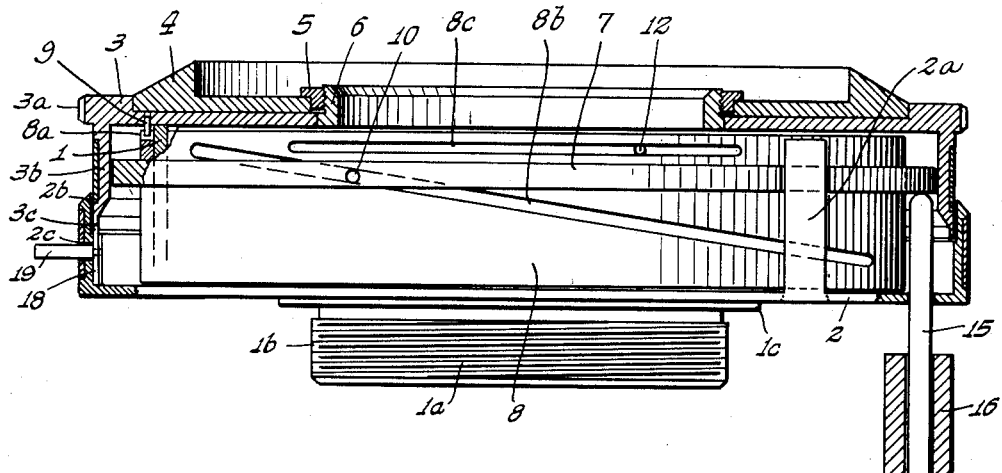
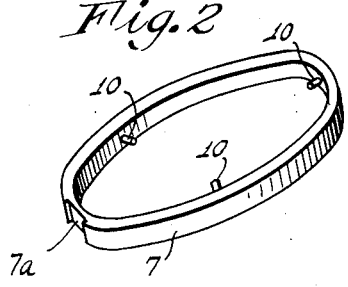
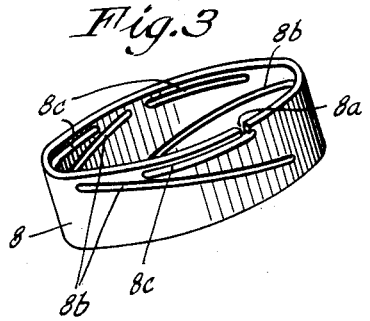
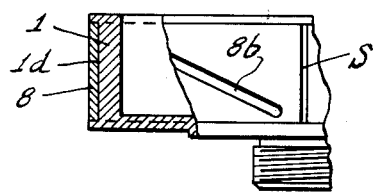
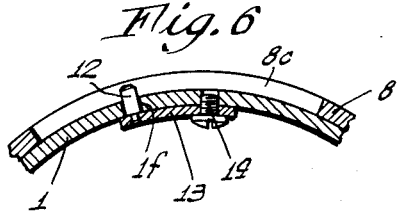
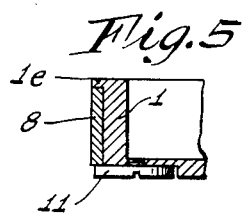
INVENTOR.
Waldemar T. Rentschler
BY
Munn, Liddy, Daniels & March
ATTORNEYS July 12, 1960     W. T. RENTSCHLER     2,944,473
PHOTOGRAPHIC INTRA-LENS SHUTTER COUPLED WITH AN EXPOSURE METER
Filed April 1, 1958     2 Sheets-Sheet 2

INVENTOR
Waldemar T. Rentschler

BY
Munn, Liddy, Daniels & March
ATTORNEY

United States Patent Office 2,944,473
Patented July 12, 1960

2,944,473
PHOTOGRAPHIC INTRA-LENS SHUTTER COUPLED WITH AN EXPOSURE METER

Waldemar T. Rentschler, Calmbach (Enz), Germany, assignor to Alfred Gauthier G.m.b.H., Calmbach (Enz), Germany, a corporation of Germany Filed Apr. 1, 1958, Ser. No. 725,627

Claims priority, application Germany Apr. 9, 1957

6 Claims. (Cl. 95—10)

This invention relates to photographic cameras, and more particularly to cameras having intra-lens shutter structures provided with setting members which are coupled with an exposure meter on the body of the camera.

The present invention concerns improvements in the camera structure with setting members coupled to an exposure meter as disclosed and claimed in the copending application Serial No. 639,993, filed February 13, 1957, and entitled Photographic Intra-Lens Shutter and Coupled Exposure Meter, and the subject matter of this invention constitutes a species of the invention of the application identified herewith.

In this prior application there is disclosed a photographic intra-lens shutter coupled with an exposure meter and having setting members for diaphragm and shutter speed arranged coaxially with respect to the shutter axis, the structure being characterized by the provision of a transmission ring disposed coaxially with the setting members and arranged to influence the tracing member of the exposure meter. The transmission ring is shiftable axially by means of a cam device arranged on the ring and on one of the setting members, said ring being also controlled by a straight guide connected with the other setting member.

The device of this prior patent application is advantageous in that a reliable and simple transmission is had, dependent on the relative positions of the diaphragm and speed setting members, thereby to effect a proper influence of the exposure meter. With the prior construction the advantageous action resulted from the fact that a change in the relative position of the setting members was transformed in a simple way into a change in axial position of the transmission ring coupled with the setting members, such ring however remaining immovable axially when the setting members are coupled together and turned simultaneously. In the prior construction there is also the advantage that the connecting parts between the transmission ring and the tracing member of the exposure meter may be arranged in a number of different ways, with great latitude, since the axial position of the transmission ring may be used in obtaining the control, by engagement between a simple pin linkage and any part of the rear face of the ring.

An object of the present invention is to provide an improved setting and coupling mechanism of the type disclosed above and having the same advantages, which mechanism further enables less critical or precise mounting means to be had for the setting members while retaining a maximum, perfectly satisfactory operating accuracy. In other words, the objective of the invention is to provide a transmission ring coupled with the setting members in such a way that the axial position of the ring, which is the determinant for the position of the tracing member of the exposure meter, is independent of axial movement or looseness of the setting members and is influenced only by the relative rotative positions of such members, which positions are independent of bearings and the like.

In accomplishing the above objective I provide a multi-part cam device one part of which is assigned to or connected with one setting member but is mounted independently thereof, said part constituting an intermediary between such member and the axially movable transmission ring (which latter influences the tracing member of the exposure meter). Such part of the cam device is on a special cam ring which is rotatably carried by the shutter housing, having a precise bearing thereon, and which is coupled to the setting member for simultaneous turning therewith without being influenced by axial movement or looseness of the setting member.

With the above construction the cam device and transmission ring may be advantageously constituted as a separate compact unit, such cam device including the special cam ring aforementioned. This unit thus may be independently arranged or mounted on a fixed bearing cylinder constituting for example part of the shutter housing structure. The said unit may in consequence be precisely mounted expressly for limiting end or axial play, and may be coupled to the setting members for simultaneous turning therewith without adverse influence due to looseness in the mounting of the setting members. Only the relative rotative positions of the setting members will therefore actuate or affect the unit comprising the cam device, and the special cam ring of such unit is so constituted that it may be precisely mounted without play in a very simple manner on the shutter housing.

The present invention thus has the special advantage that the type of bearing for the setting members and the amount of bearing play in an axial direction has not the slightest influence movement on the axial positioning of the shiftable transmission ring and therefore on the operating accuracy of the cam mechanism by which the exposure meter is actuated.

The special cam ring is so constituted that it may be mounted in various advantageous ways. For example, the ring may be inserted into an outwardly open, shallow annular groove provided in a shutter housing side wall. To insert the ring in such groove, the ring may be made resilient and provided with a single through cut. Or, the ring may be made of two semi-circular halves, which may be joined by any suitable fastening device. Other ways of advantageously mounting the special cam ring are also possible, with the construction provided by the invention. For example, a shoulder may be provided on the shutter housing side wall, against which the ring may be positioned, and one or more abutment members may be attached to the shutter housing, to constitute an end bearing for the ring and prevent axial movement thereof. Such abutment members may be split rings, discs, holding angles or headed screws or the like, and these fastenings are of advantage where it is not desired to cut through the special cam ring for reasons of stability, etc. Such fastenings are also of advantage where the cam device is constituted to have threads which make it undesirable to cut through the ring. Moreover, the attachable abutments can provide for a very easy and quick mounting of the ring on the shutter housing.

Another means by which the special cam ring may be held in place against axial movement comprises pin-and-slot connections between the ring and the shutter housing side wall. With such organization the entire axial length of the housing side wall is available to the ring, making it possible to effect the greatest cam-actuated movement of the transmission ring through utilization of a cam ring of greatest axial dimension.

When using a pin-and-slot arrangement the pins may be readily securely mounted by fastening them to base parts which are then attached to the member of which the pins are to constitute a part.

In the accompanying drawings there is illustrated an embodiment of the invention, and also various forms of mounting or bearing means for the special cam ring.

Figure 1 is an enlarged view partly in axial section and partly in side elevation, of a photographic intra-lens shutter structure made in accordance with the invention, incorporating a special separate cam ring connected with one of the setting members. The special cam ring cooperates with a turnable transmission ring which is also shiftable axially and which influences the tracing member of an exposure meter through the medium of a transmission pin. The transmission ring is connected with the other of the setting members in a manner to turn simultaneously therewith while still being permitted axial movement.

Fig. 2 is a perspective view of the transmission ring shown in Fig. 1.

Fig. 3 is a perspective view of the special cam ring shown in Fig. 1.

Fig. 4 is a fragmentary view slightly reduced showing the special cam ring and mounting structure therefor in an arrangement wherein the ring is resilient and split, for the purpose of placing it in its bearing.

Fig. 5 is a fragmentary view similar to that of Fig. 4, but showing another type of mounting or guide means for the special cam ring.

Fig. 6 is a fragmentary transverse sectional view of the special cam ring and shutter housing mounting means therefor, as provided in the embodiment of the invention shown in Fig. 1.

Figure 7:
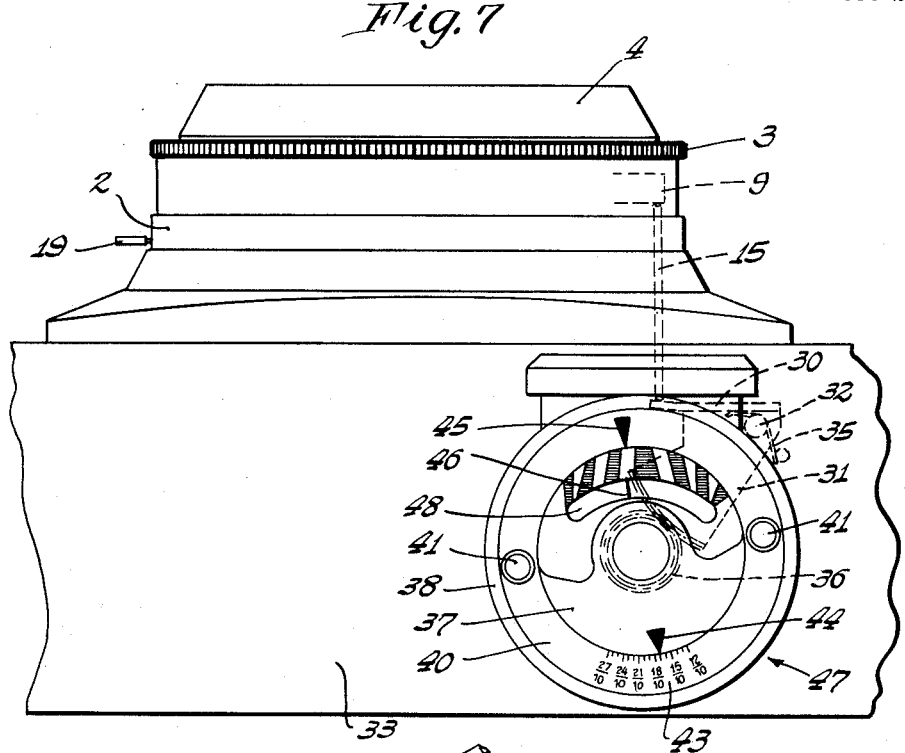
Fig. 7 is a fragmentary top plan view of a photographic camera having an intra-lens shutter and coupled exposure meter, illustrating the main details of the exposure meter and coupling means associated therewith.

In Figs. 1 and 4 to 6, the housing of the intra-lens shutter structure of the present invention is indicated by the numeral 1. At its center, the housing 1 has the usual nozzle 1a (Fig. 1) provided with threads 1b by which the shutter structure may be mounted in the well-known manner on the camera proper.

At the rear of the housing 1 there is provided in the well-known manner a diaphragm setting ring 2, positioned on a bearing shoulder 1c. At its front the housing 1 turnably carries a speed setting ring 3 which is equipped with the usual knurling 3a. The speed setting ring 3 is held in place by a usual type of front plate 4 fastened to the front portion 6 of the nozzle by a threaded ring 5 as clearly shown.

As in the copending application above referred to, the relative rotative positions of the diaphragm setting member 2 and the speed setting ring 3 determine the axial position of a transmission ring which is disposed so as to be coaxial with the shutter axis. In accordance with the present invention, however, the transmission ring (here indicated by the numeral 7) is associated with a special cam ring so as to constitute an independent unit therewith, said unit being carried by the shutter housing and being responsive only to rotative movements of the setting rings and not to any axial movements or looseness of such setting rings. In Figs. 1, 3, and 4 to 6 the special cam ring is indicated by the numeral 8, said cam ring being coupled with the speed setting ring 3 for simultaneous turning therewith although being independently mounted with respect to the speed setting ring. By the present invention the driving connection between the special cam ring 8 and the speed setting ring 3 is utilized only to provide simultaneous turning of such rings, and such connection does not involve special requirements when assembling the shutter structure. This driving connection comprises a pin-and-slot drive, which permits quick and easy assembly of the cooperable parts. In the illustrated embodiment of the invention as shown in Fig. 1, a pin 9 is fixed on the rear face of the speed setting ring 3, such pin being received in a notch 8a provided in the front periphery of the special cam ring 8. The transmission ring 7 is coupled to the diaphragm setting ring 2 for simultaneous turning movement therewith, and is also independently mounted with respect to such diaphragm setting ring, there being a straight guide connection permitting relative axial movement between the said rings. This guide may be formed in a simple manner, as by the provision of an arm 2a, Fig. 1, constituting a portion of the diaphragm setting ring 2, said arm 2a being bent to extend parallel to the shutter axis and being received in a recess 7a provided in the outer peripheral surface of the transmission ring 7. The ring 7 shown herein in Figs. 1 and 2 corresponds to the transmission ring 9 of my application above referred to.

The rings 7 and 8 illustrated herein together constitute a cam device, and by the present invention one part of such cam device is assigned to one setting ring, this being the speed setting ring 3 shown in the illustrated embodiment of the invention. Such part of the cam device may be constituted by camming edges or slots 8b which are incorporated in the special cam ring 8 which, then, is connected with the speed setting ring 3 by the pin 9 and notch 8a so as to turn simultaneously therewith at all times. The special cam ring 8 has a bearing on the shutter housing 1, as will be readily seen in Fig. 1, and is turnable about such housing while being prevented for all practical purposes from having axial movement with respect thereto.

By the provision of the special cam ring 8 which is mounted on the shutter housing 1 and which is independent, as regards its bearing, of any of the setting members there is obtained a special advantage in that the setting members are not required to be precisely mounted without any play or looseness in order to maintain a high accuracy in the functioning of the cam device. Since the carrier or bearing for the special cam ring 8 is constituted by the rigid or fixed shutter housing 1 a close fit may be established between these parts, eliminating the necessity for close fits and tolerances between the setting members 2 and 3 and the mounting part therefor. The transmission ring 7, moreover, is rotatably carried by the special cam ring 8, and is therefore also independent of any looseness in the mounting of the setting members 2 and 3. In consequence, the axial position of the transmission ring 7, which is transmitted to the exposure meter through the transmission pin 15, is not affected by looseness of the setting members 2 and 3 but instead is influenced only by the relative rotative positions of the setting rings. Any looseness or play in the mountings for the setting rings thus will have no adverse affect on the transmission ring 7 and in consequence on the accuracy of adjustment of the exposure meter as effected by the rotative positions of the setting members.

Additionally by the provision of the special cam ring 8 as a member separate from the setting member there results a desirable economy of manufacture, since the setting member (in the illustrated embodiment the speed setting ring 3) may be manufactured as a unit completely independent of the special cam ring 8. Thus, complicated or critical manufacturing procedures involving costly operations on the setting ring are eliminated.

In the illustrated embodiment of the invention the camming function between the transmission ring 7 and the special cam ring 8 is provided by a plurality of cam slots $8b$ formed in the mantle of the ring 8, said slots receiving inwardly projecting cam pins 10 which are fixed to the inner periphery of the transmission ring 7.

The above cam arrangement may be easily and economically manufactured, and is susceptible of easy assembly. The forming of the cam slots $8b$ in the ring 8 may be quickly and accurately done as by a punching operation, and the insertion of the pins 10 in the ring 7 may be easily effected. For example, the pins 10 may be in the form of small headless screws which then would be threaded into the ring 7.

Figure 8:
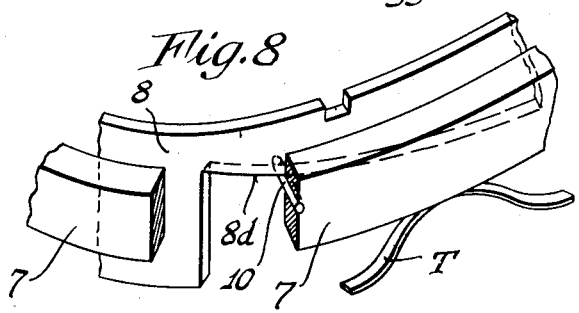
Fig. 8 is a fragmentary perspective view of an assembly comprising a transmission ring and a special cam ring, illustrating another embodiment of the invention.
Figure 10:
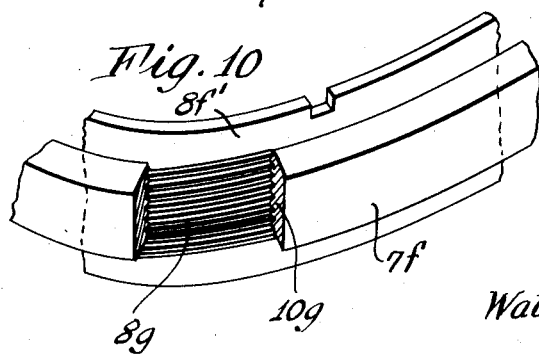
Fig. 10 is a view like Fig. 8, but illustrating still another type of transmission and special cam ring assembly wherein screw threads are employed to effect relative axial movements of these rings.

Instead of the through slots $8b$ in the special cam ring 8, grooves may be provided in its exterior surface, which do not go entirely through the wall of the ring. With such construction a greater stability or rigidity of the ring would be had. Or, as another alternative, a thread type of guide or cam may be provided between the rings 7 and 8, which is shown in the device of the copending application above referred to. As seen in Fig. 10, there is provided a transmission ring $7f$ having internal threads $10g$, the said threads being engaged with external threads $8g$ provided on a "cam" ring $8f'$. By the provision of the cooperable threads $8g$ and $10g$, relative axial movement is effected between the transmission ring $7f$ and the "cam" ring $8f'$ in response to relative turning between these rings. In place of the positive type of cam drive as provided by the pins 10 and cam slots $8b$, a biased type of drive might be provided, involving spring means and camming parts which act unidirectionally and are held in engagement by the spring means. Such an organization is illustrated in Fig. 8, wherein the transmission ring 7 carrying the cam-follower pin 10, is spring-urged by a leaf-spring T, several of which springs may be obviously provided around the circumference of the transmission ring 7. The cam follower pins 10 of the transmission ring 7 are arranged to engage sloping cam surfaces $8d$ provided on the cam ring 8. By such organization relative axial movement between the rings 7 and 8 is effected in response to relative turning of said rings.

As stated above, the special cam ring 8 is rotatably mounted on the shutter housing 1 and prevented from having any appreciable axial movement. The bearing or fastening means by which such mounting is effected may be carried out in various ways, each way having certain advantages over the others depending on the particular circumstances, shutter structures, etc.

Referring to Fig. 4, the ring 8 may be secured on the shutter housing 1 by providing an outwardly opening shallow annular groove $1d$ in the housing, and by forming the ring 8 to be resilient and to have a through cut, as indicated at S in the figure. With this arrangement, the ring 8 may be opened up to the degree necessary to permit it to be slipped axially over the shutter housing and positioned in the shallow groove $1d$ thereof. Preferably, the cam ring 8 is sufficiently resilient to cause it to snap into place and to fit closely against the bottom wall of the shallow groove $1d$ in the shutter housing 1, without appreciable looseness, while at the same time being freely turnable.

Figure 9:
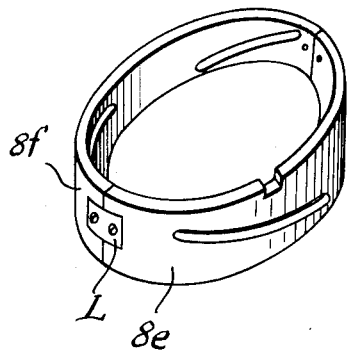
Fig. 9 is a perspective view of a special cam ring as provided by the invention, illustrating yet another embodiment thereof.

As an alternative construction, the ring 8 may be constituted as two separate semi-circular parts, which may then be readily inserted in the annular groove $1d$ and connected together or fastened by means of suitable fastening devices, as for example loops. Such alternative construction is illustrated in Fig. 9, wherein the cam ring 8 may be constituted of two separate halves $8e$ and $8f$, the said halves being secured together by a pair of straps L. The two ring halves $8e$ and $8f$ are inserted in the opening or recess $1d$ of the shutter housing prior to being secured together by the straps L, and after such insertion the halves are attached to each other by use of the said straps, which may be secured by suitable screws as shown.

A U-section bearing or guide for the ring 8 as illustrated in Fig. 4 has the advantage that a close fit may be established between the ring and the shutter housing, since both of these are susceptible of fabrication using turning processes, as by means of a lathe.

Another method for mounting the special cam ring 8 is illustrated in Fig. 5. Here, the shutter housing 1 is provided with an annular abutment or shoulder $1e$ at its front edge, and headed retaining screws 11 are threaded into the rear face of the shutter housing, to engage the rear edge of the cam ring 8. In place of the screws 11, square holders or a single locking disc concentrically arranged with respect to the ring 8 may be fastened or screwed on the shutter housing.

A mounting means shown in Fig. 5 provides for a simple and easy mounting of the special cam ring 8 on the shutter structure. This results because the parts of the mounting device, namely the headed screws 11, are detachably connected with the shutter housing so that the ring 8 can be simply pushed over the outer wall of the housing and thereafter held in place by applying the screws 11. The construction of Fig. 5 is of particular advantage where it is found to be undesirable to cut or otherwise separate the ring 8 into individual parts.

Another arrangement for securing the special cam ring 8 on the shutter housing 1 against axial movement is illustrated in Figs. 1 and 3. This arrangement is characterized by pin-and-slot connections between the ring 8 and the shutter housing 1. For example, the shutter housing may be provided with a plurality of outwardly radially projecting pins 12 (see Fig. 6) which are received in circumferential slots $8c$ in the special cam ring 8. The slots $8c$, of course, correspond in length to the shifting or turning range which the cam ring 8 is to have.

In the illustrated embodiment of the invention, the shutter housing 1 carries the pins 12, whereas the cam ring 8 is provided with the co-operable slots for such pins.

An advantage which resides in the use of the pins 12 and slots $8c$ is that the space required is not beyond the axial dimensions of the cam ring 8. Thus, the cam ring may have an axial dimension as great as the axial dimension of the supporting shutter housing wall 1, thereby enabling the greatest possible range for the cam slots $8b$ and the greatest possible axial shifting movement of the transmission ring 7 which influences the transmission pin 15 actuating the exposure meter of the camera.

An advantageous arrangement for mounting the pins 12 on the shutter housing 1 is shown in Fig. 6. Such arrangement also may be employed where mounting the pins 10 on the ring 7, or in mounting the pins 12 on the special cam ring 8 when this ring is not to have the slots $8c$ but instead the slots are to be provided in the shutter housing wall 1. As seen in Fig. 6, the pins 12 are constituted as rivets and are mounted on flat carrier discs or strips 13 which are secured to the shutter housing wall 1 by suitable screws 14. The pins 12 project radially outward through openings in the wall 1 and protrude radially beyond the said wall, to be received in the slots $8c$.

In this manner the pins 12 may be simple and quickly mounted on the housing side wall or on the rings, where desired. The location of the pins 12 will be accurately determined not by the strips 13 but instead by the openings $1f$, through which the pins extend, and such openings may be accurately located either by drilling or punching.

Where the pins 12 are to be mounted on the rings 7 or 8, such rings may be milled to provide space for the carrier plates 13, whereby the total nominal thickness of the rings is not exceeded because of the presence of the plates or discs 13.

As above mentioned, a straight guide is provided between the control or transmission ring 7 which influences the tracing member or transmission pin 15, and the diaphragm setting ring 2. This guide may be formed in a simple manner, as by the provision of an arm 2a, Fig. 1, constituting a portion of the diaphragm setting ring 2, said arm 2a being bent to extend parallel to the shutter axis and being received in a recess 7a provided in the outer peripheral surface of the transmission ring 7.

The axial movements of the transmission ring 7 are transferred to the exposure meter in a manner similar to that disclosed in the copending application above referred to, that is, by means of a cylindrical transmission pin 15 which is shiftable axially and which corresponds to the pin numbered 11 in this copending application. A spring 17 on the pin 15 engages a shoulder 15a of such pin, and maintains the pin in constant engagement with the transmission ring 7.

Greatly detailed drawings of the camera body and exposure meter carried thereby are not provided herewith, since such structures are known in the art and are described in detail in the copending application above identified, which may be referred to. The same type of exposure meter and camera structure as that shown in this copending application may be employed herein. Essential structures of this assemblage are shown in Fig. 7, including the means by which the transmission pin 15 effects actuation of the tracing member of the exposure meter. In this figure, the transmission pin 15 is shown as engaging a lug 30 carried by a toothed segment 31 which is pivotally mounted on a pivot pin 32 fixed to the camera housing 33. The lug 30 is disposed generally in a plane which extends transversely of or at right angles to the axis of the shutter structure of the camera.

The toothed segment 31 is acted on by a wire spring 35 which is carried by the pivot pin 32, thereby to bias the segment 31 clockwise as viewed in Fig. 7, and accordingly such spring will maintain the transmission pin 15 in continual engagement with the transmission ring 7, as shown.

The toothed segment 30 meshes with a gear 36 which is carried by a disk-shaped member 37 having a ring-shaped rim 38. The member 37 rotatably mounts an indicator 40 adapted to be manually shifted by means of gripping pins 41 secured thereto and extending outwardly therefrom. On the ring 40 there is provided a film sensibility scale 43 which is cooperable with an index mark 44 carried on the member 37. Also, the ring 40 carries an index mark 45 which is cooperable with a pointer 46 of the instrument movement of the exposure meter 47. Such pointer is visible through an arcuate window 48 of the exposure meter.

Axial shifting of the transmission pin 15 will thus effect a turning movement of the toothed segment 31, which in turn effects rotation of the gear 36 and the disk-shaped member 37. The indicator 40 may turn with the disk 37 during such adjusting movement as effected by the transmission pin 15.

As is also shown in the copending application above identified, the setting rings 2 and 3 may carry cylindrical mantles 2b and 3b respectively, which overlap the shutter housing side wall and each other. The transmission ring 7 is disposed between the external circumference of the shutter housing side wall 1 and the inner walls of the cylindrical mantles 2b and 3b as shown in Fig. 1, whereby a very compact structure of the shutter is obtained. At the same time, such arrangement of the cylindrical mantles 2b and 3b enables a well-known releasable coupling to be incorporated between the setting rings for diaphragm and speed, in an advantageous manner.

Such coupling is clearly illustrated in Fig. 1, and comprises a resilient part 18 carried by the cylindrical mantle 2b of the diaphragm setting ring 2. The part 18 is adapted to engage notches 3c provided on the speed setting ring 3. For the purpose of actuating the coupling a finger piece 19 is provided, which protrudes outward through a slot 2c in the mantle 2b. By pressing down or inward on the finger piece 19 the coupling between the setting rings 2 and 3 may be released, whereas the rings will be automatically coupled upon removal of actuating force from the piece 19.

The procedure by which the speed setting is effected, in the shutter structure as illustrated herein, is the same as described in the copending application above identified. by first pressing inward the actuation member 19 the coupling connection between the two setting rings 2 and 3 is released. Then, the diaphragm setting ring 2 or the speed setting ring 3 may be turned and adjusted to the desired settings.

Turning of the speed setting ring 3 will, of course, turn the special cam ring 8, by virtue of the pin and slot connection 9, 8a between these rings. The ring 3 is turned until there is established coincidence between the pointer of the exposure meter and a setting mark which is arranged at the tracing member of the exposure meter and which is actuated by the pin 15 and transmission ring 7. In this manner, the speed-diagram proportion is adjusted on the shutter, to correspond to the existing conditions for taking the photograph. The setting rings 2 and 3 may now be recoupled, by releasing the finger member 19.

Upon this being effected, turning of the coupled setting rings 2 and 3 in unison will effect a joint change of the settings for speed and diaphragm, by which there is selected a pair of speed and diaphragm values adapted to the subject which is to be photographed. During such turning in unison there will be no axial movement of the transmission ring 7, and consequently there will be no actuation of the tracing member of the exposure meter, which has been previously set to the proper value through effecting coincidence of the exposure meter pointer and a cooperable setting mark of the exposure meter.

Variations and modifications may be made within the scope of the claims, and portions of the improvement may be used without others.

I claim:

1. The combination with a camera having a photographic intra-lens shutter including a peripheral shutter housing and having an exposure meter and diaphragm and shutter speed setting members disposed coaxially with respect to the axis of the shutter, of a transmission ring mounted on the shutter for both turning and axial movement thereon, said ring being coaxial with the shutter structure and with said setting members; a movable tracing member associated with said exposure meter; drive means for actuating said tracing member in response to axial movement of said transmission ring; and control means for shifting said transmission ring axially in response to relative turning movement of said setting members, said control means including as a portion a separate cam ring having a driving connection with one of said setting members to turn simultaneously therewith, and means mounting said cam ring on the periphery of the shutter housing for turning movement, said mounting means being independent of said setting members; and means holding said cam ring against axial movement.

2. The invention as defined in claim 1 in which the shutter housing has a side wall provided with an annular groove in which the cam ring is disposed, and in which the cam ring is resilient and has a through cut to enable it to be spread apart for insertion in or removal from said groove.

3. The invention as defined in claim 1 in which the shutter housing has a side wall provided with an annular groove in which the cam ring is disposed, and in which the cam ring is constituted of two separate parts secured together to hold it in the said groove.

4. The invention as defined in claim 1 in which shutter housing has a side wall provided with an annular shoulder, said cam ring being rotatably carried by said wall against the shoulder thereof, and in which there is a retaining member detachably secured to said side wall, engaging said cam ring to hold the latter against appreciable axial movement.

5. The invention as defined in claim 1 in which the shutter housing has a side wall on which the cam ring is rotatably carried, and in which there are pin-and-slot connections between the housing side wall and cam ring, said pins extending radially and said slots extending circumferentially to limit axial movement of the ring while permitting rotative movement thereof.

6. The invention as defined in claim 5 in which there are separate carrier members to which the pins are secured, mounting said pins on the shutter housing side wall.

References Cited in the file of this patent

UNITED STATES PATENTS

| | | |
|---|---|---|
| 2,186,616 | Mihalyi | Jan. 9, 1940 |
| 2,360,256 | Mihalyi | Oct. 10, 1944 |
| 2,467,946 | Rossman | Apr. 19, 1949 |

FOREIGN PATENTS

| | | |
|---|---|---|
| 756,282 | Germany | Feb. 25, 1953 |